(12) United States Patent
Baardse et al.

(10) Patent No.: US 9,927,965 B2
(45) Date of Patent: Mar. 27, 2018

(54) OBJECT SELECTION SYSTEM AND METHOD

(71) Applicant: SIEMENS PRODUCT LIFECYCLE MANAGEMENT SOFTWARE INC., Plano, TX (US)

(72) Inventors: Dick Baardse, Geldermalsen (NL); Michael Nelson, Long Beach, CA (US); James Carrington, Cambridge (GB); Timothy A. Kelker, Hamilton, OH (US)

(73) Assignee: SIEMENS PRODUCT LIFECYCLE MANAGEMENT INC., Plano, TX (US)

( * ) Notice: Subject to any disclaimer, the term of this patent is extended or adjusted under 35 U.S.C. 154(b) by 244 days.

(21) Appl. No.: 14/838,957

(22) Filed: Aug. 28, 2015

(65) Prior Publication Data
US 2017/0060384 A1    Mar. 2, 2017

(51) Int. Cl.
*G06T 19/00*    (2011.01)
*G06T 19/20*    (2011.01)
(Continued)

(52) U.S. Cl.
CPC ........ *G06F 3/04842* (2013.01); *G06F 3/0482* (2013.01); *G06F 3/04815* (2013.01); *G06F 3/04845* (2013.01); *G06F 3/04883* (2013.01)

(58) Field of Classification Search
None
See application file for complete search history.

(56) References Cited

U.S. PATENT DOCUMENTS 5,548,705 A * 8/1996 Moran ................ G06F 3/04842
345/642
5,689,628 A * 11/1997 Robertson ............... G06T 15/10
345/427

(Continued)

FOREIGN PATENT DOCUMENTS

EP    0566293 A2    10/1993

OTHER PUBLICATIONS

Anonymous: "Photoshop Help / 3D painting / CC, CS6", Jul. 3, 2013, Retrieved from the Internet: URL:https://web.archive.org/web/20130703235521/http://helpx.adobe.com/photoshop/using/3d-painting-photoshop.html [retrieved on Oct. 4, 2016], pp. 1-4.

(Continued)

*Primary Examiner* — Mahelet Shiberou

(57) ABSTRACT

A system and method is provided that facilitates the selection of individually selectable three dimensional objects displayed through a display device. The system may include at least one processor that is configured to determine at least one path that traverses the objects based on at least one motion input received through an input device. The processor may also cause at least two of the objects to be selected in a group while at least one of the objects remains unselected based on an amount of a surface area of each object that was traversed by the at least one path. In addition, the processor may cause at least one operation to be carried out on the group of at least two objects that are selected and not on the at least one object that remains unselected based on whether the objects are selected, responsive to at least one operation input received through the input device.

17 Claims, 11 Drawing Sheets

(51) Int. Cl.
*G06F 17/50* (2006.01)
*G06F 3/0484* (2013.01)
*G06F 3/0481* (2013.01)
*G06F 3/0488* (2013.01)
*G06F 3/0482* (2013.01)

(56) References Cited

U.S. PATENT DOCUMENTS

| | | | |
|---|---|---|---|
| 9,489,689 B2* | 11/2016 | Stewart | H04N 21/23614 |
| 2009/0307623 A1* | 12/2009 | Agarawala | G06F 3/04815 |
| | | | 715/765 |
| 2011/0141109 A1* | 6/2011 | Radet | G06F 3/0481 |
| | | | 345/420 |
| 2011/0148873 A1* | 6/2011 | Radet | G06F 17/50 |
| | | | 345/420 |

OTHER PUBLICATIONS

PCT International Search Report and Written Opinion dated Oct. 12, 2016 corresponding to PCT Application No. PCT/US2016/044633 filed Jul. 29, 2016 (14 pages).
Taylor, Ben; "Can Splatoon Save Nintendo's Wii U?", business2community, Jun. 12, 2015, retrieved from "www.business2community.com/tech-gadgets/can-splatoon-save-nintendos-wii-u-01250023".

* cited by examiner

OBJECT SELECTION SYSTEM AND METHOD

TECHNICAL FIELD

The present disclosure is directed, in general, to computer-aided design (CAD), visualization, and manufacturing systems, product data management (PDM) systems, product lifecycle management (PLM) systems, and similar systems, that are used to create and manage data for products and other items (collectively referred to herein as product systems).

BACKGROUND

PLM systems may include components that facilitate the design of product structures. Such components may benefit from improvements.

SUMMARY

Variously disclosed embodiments include systems and methods that may be used to facilitate the selection of objects. In one example, a system may comprise at least one processor. The processor may be configured to cause a display device to display a plurality of individually selectable three dimensional objects. Also, the at least one processor may be configured to determine at least one path that traverses the objects based on at least one motion input received through operation of at least one input device. In addition, the at least one processor may be configured to cause at least two of the objects to be selected in a group while at least one of the objects remains unselected based on an amount of a surface area of each object that was traversed by the at least one path. Further, the at least one processor may be configured to cause at least one operation of a plurality of operations to be carried out on the group of at least two objects that are selected and not on the at least one object that remains unselected based on whether the objects are selected, responsive to at least one operation input received through the at least one input device.

In another example, a method may include various acts carried out through operation of at least one processor. Such a method may include: causing a display device to display a plurality of individually selectable three dimensional objects; determining at least one path that traverses the objects based on the at least one motion input received through operation of at least one input device; causing at least two of the objects to be selected in a group while at least one of the objects remains unselected based on an amount of a surface area of each object that was traversed by the at least one path; and causing at least one operation of a plurality of operations to be carried out on the group of at least two objects that are selected and not on the at least one object that remains unselected based on whether the objects are selected, responsive to at least one operation input received through the at least one input device.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
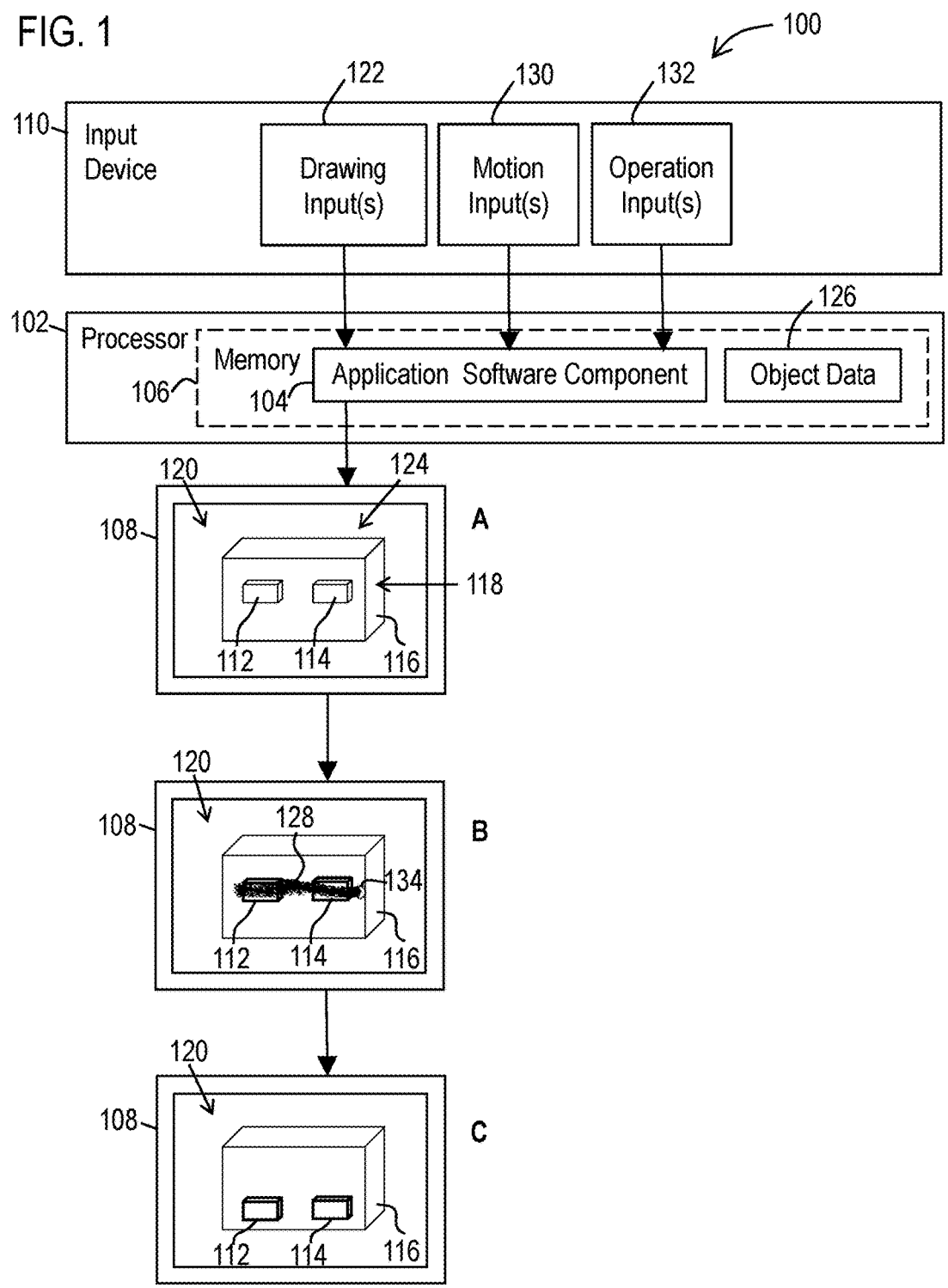
FIG. 1 illustrates a functional block diagram of an example system that facilitates selection of objects.

Various technologies that pertain to systems and methods to select objects will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Many forms of drawing systems (such as CAD software) are operative to manipulate various types of three dimensional objects that comprise one or more structures. Such objects may include manufactured objects such as parts, assemblies and subassemblies, which are used to construct structures. As an example, a wagon structure may be comprised of a bed to which several parts are mounted. Such parts may include a handle and four wheels that are mounted via brackets, axles, bearings, and fasteners such as bolts, washers, and nuts. All of these parts correspond to 3-D parts that may be drawn and manipulated via CAD software or other drawing system. Further, it should be appreciated that drawing systems may also be capable of drawing and manipulating more generic 3-D objects such as geometric 3-D shapes including squares, prisms, spheres, cones, cylinders, cubes, and/or cuboids.

Thus in general, a 3-D object may correspond to any type of 3-D object that can be displayed through a display device (such as a display screen) that is capable of being manipulated via inputs through an input device with respect to shape, size, orientation, position, visibility, transparency, color, physical properties, annotations, and/or any other characteristic of the object.

With reference to FIG. 1, an example system 100 that facilitates drawing and manipulating objects is illustrated. The system 100 may include at least one processor 102 that is configured to execute one or more application software components 104 from a memory 106 in order to carry out the various features described herein. The application software component 104 may include a drawing software application or a portion thereof such as a CAD software application.

Such a CAD software application may be operative to produce and edit a CAD drawing based at least in part on inputs provided by a user.

An example of CAD/CAM/CAE (Computer-aided design/Computer-aided manufacturing/Computer-aided engineering) software that may be adapted to include at least some of the functionality described herein includes the NX suite of applications that is available from Siemens Product Lifecycle Management Software Inc. (Plano, Tex.). However, it should also be understood that such a drawing software application may correspond to other types of drawing software, including architectural software and/or any other type of software that involves drawing and manipulation of 3-D objects of structures.

The described system may include at least one display device 108 (such as a display screen) and at least one input device 110. For example, the processor may be included as part of a PC, notebook computer, workstation, server, tablet, mobile phone, or any other type of computing system. The display device, for example, may include an LCD display, monitor, and/or a projector. The input devices, for example, may include a mouse, pointer, touch screen, touch pad, drawing tablet, track ball, buttons, keypad, keyboard, game controller, camera, motion sensing device that captures motion gestures, or any other type of input device capable of providing the inputs described herein. Also for devices such as a tablet, the processor 102 may be integrated into a housing that includes a touch screen that serves as both an input and display device. Further, it should be appreciated that some input devices (such as a game controller) may include a plurality of different types of input devices (analog stick, d-pad, and buttons).

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

FIG. 1 schematically illustrates a plurality of different views (A-C) of the display device 108 that are caused to be displayed by the processor 102 in response to various inputs received through the input device 110. For example, in view A of the display device 108, the processor 102 may be configured (e.g., via the application software component) to cause the display device 108 to display a structure 118 in a workspace 120.

The workspace 120 may correspond to a three dimensional space in which objects are visually drawn, displayed, and manipulated using a graphical user interface (GUI) 124 of the application software component 104 in order to create at least one desired structure 118. In example embodiments the display device 108 may correspond to a two dimensional (2D) display screen, through which different views of a three dimensional (3D) workspace and structure 118 may be viewed. Also in other examples, 3D displays may be used to display 3D structures in a 3D workspace.

The example shown in FIG. 1 depicts a generic structure 118 that includes two smaller objects 112, 114 connected to (and/or adjacent to) a larger object 116. Such objects are depicted as block type parts. However, it should be appreciated that these objects are intended to generically illustrate features that may apply to any type of component of a structure and/or separate structures.

Objects may be drawn and/or edited in the workspace 120 responsive to drawing inputs 122 received through the input device 110. Data representative of the drawn objects may be stored in the memory 106 as object data 126. However, it should also be appreciated that such object data 126 may be retrieved from a CAD file and/or a data store via inputs through the input device 110 and the processor may be configured to display the objects through the display device responsive to the loaded object data.

The GUI 124 may include functions that enable a user via inputs through the input device 110 to select individually one or more of the objects 112, 114, 116 of the structure 118. For example, the GUI may enable a user to select an individual object via a mouse click, and select additional objects via a mouse click while holding down a control key of a keyboard. Further, the GUI may enable one or more objects to be selected via using a rectangular selection box in which a mouse is used to draw a box over objects, and the objects under the box become selected. However, it should be appreciated that individually selecting objects via individually clicking on them may be slow and tedious for large numbers of small objects. Also, a rectangular selection box (while potentially being faster) may select objects that are not desired to be selected.

In order to provide more granularity to the selection process in a manner that may be faster than individually clicking on each desired object to be selected, an example embodiment, may enable a user to quickly draw one or more paths 128 over objects to be selected responsive to one or more motion inputs 130 through the input device 110. In order for a user to visualize the path, the described processor may be operative to change the appearance of portions of each particular object that are traversed by the at least one path, which is determined by the processor based on the at least one motion input.

For input devices such as a mouse, such motion inputs may be produced via a mouse type input device moving a mouse pointer across the display screen while a mouse button is depressed and along areas in which the path is desired to be located. Similar for a touch screen type input device, a user may slide a finger along a surface of the touch screen over the areas in which the path is desired to be located. However, the input devices for providing motion inputs are not limited to a mouse or touch screen, but may correspond to any type of input device capable of providing data representative of a path over one or more objects that are desired to be selected.

View B of FIG. 1 shows an example of such a path 128 over objects 112, 114, and 116. In this example the path has a form of a stripe across the structure 118 that covers surfaces of the structure. Here the stripe is shown as having a black color covering/replacing the previously shown white surfaces of the objects shown in View A of FIG. 1. It should be appreciated that example embodiments may produce the change in appearance by one or more different color changes, texture changes, brightness changes, line patterns, or any other visual change to the appearance of the surfaces of the objects that can be perceived by the end user of the system.

However in this described embodiment, rather than selecting each object that is traversed (i.e., crossed and/or covered) by the path, the processor may be configured to only select those objects in which a predetermined fraction of their respective surface areas are traversed by the path. In other words, the processor may cause a one or more of the objects having a change in appearance to be selected while one or more of the objects having a change in appearance may remain unselected based on an amount of a surface area of each object that was traversed by the at least one path.

In this example, the majority of the visible surfaces of the smaller objects 112, 114 are covered by the path 128, whereas only a small fraction (e.g., less than 15%) of the visible surfaces of the larger object 116 are covered by the path 128. Thus, in this example, the processor may be configured to only select the smaller objects 112, 114 and not the larger object 116 based on an amount of surface area of each component that was traversed (i.e., covered) by the path.

In example embodiments, the path may be determined from the motion inputs (e.g., a change in coordinates of a pointer 134) by determining the positions of the mouse pointer 134 relative to the positions of objects and based on these relative positions determine how the surfaces of objects should be changed in appearance. In other words, the determined path may correspond to the locations on the objects where the objects should experience a change in appearance based on the motion inputs. Then based on the path (i.e., the determined locations on the objects to change), the processor may then cause corresponding changes to the appearances (e.g., a color change) of the objects at these locations.

It should be appreciated that the width of the path may be a user configurable parameter. Also, the size of the pointer 134 in some examples may change to correspond to and visually represent the particular path width chosen by a user for drawing the path. It should also be appreciated that in example embodiments, the surface area that experiences a change in appearance may match the locations of the path determined by the processor based on the motion inputs. In other words, everywhere the processor determines location areas for a path, the processor may cause the portions of the objects at the determined location area of the path to have a change in appearance.

However, in example embodiments it should be appreciated that the actual changes to the appearances of the objects that are visible to a user through the display device may only approximate the determined location areas for the path. The surface areas that are changed in color, for example, may be smaller or larger than the determined path by various amounts, but still enable a user to perceive the general location and size of the path with respect to each object. For example, variations between how the changes of appearance on the objects is perceived may vary from the path based on the resolution of the display device compared to the sizes of the objects being displayed. In this example small objects such as objects 112, 114 may be displayed by the display device with less pixels than the larger object 116, and thus may be less able to accurately approximate the location of the path than the larger object.

Also, it should be appreciated that the path (and/or the change in appearance that corresponds to the path) may not be solid. For example, as shown in View B of FIG. 1, the path and/or the change in appearance that corresponds to the path, may have fuzzy, thin, or speckled. In other examples, the path and/or the changed in appearances that correspond to the path may be comprised of spots, holes, hatching, stripes, dashes, broken lines, or other patterns. Thus, paths without holes or with relatively less holes may be determined to traverse more surface area of the objects than paths with holes or relatively more holes. However, in other embodiments the presence of such holes and/or thin/fuzzy areas may merely correspond to a visual representation of the location of the path and may not decrease the amount of surface area that is determined to be traversed by the path.

It should be appreciated that when 3D objects are displayed on a 2D display screen, even though portions of the objects may be partially occluded (i.e., partially covered/blocked by other objects), the objects will still include a forward facing surface area that is capable of being fully visible when displayed through the display device while not being occluded by one or more other objects. Thus, with respect to View A of FIG. 1, the forward facing surface area of the larger object 116 includes the areas under the smaller objects 112, 114, even though those areas are currently occluded by the smaller objects.

In example embodiments, the processor may be configured to determine an amount of forward facing surface area for each object. The processor may also be configured to cause the portion of the objects having a change in appearance to be selected while at least some of the objects having a change in appearance remain unselected based on the fraction (e.g., percentage) of the determined amount of forward facing surface area of each object that was traversed by the at least one path. Thus, in view B of FIG. 1, the fraction of the surface area of the path 128 that traverses the larger object 116, is with respect to the entire forward facing surfaces of object 116, including the visible surfaces and the surfaces hidden under the objects 112, 116.

Also, the processor may be operative to determine a threshold amount that corresponds to a fractional amount (e.g., a threshold percentage) of a forward facing surface area. Such a threshold amount may correspond to a predetermined amount which maybe configurable via the GUI by a user. The processor may then determine objects to be selected that have a visible fraction of the determined amount of forward facing surface area that was traversed by the at least one path that is equal to or greater than the threshold amount. With respect to View B of FIG. 1, the visible fraction of the determined amount of forward facing surface area that was traversed by the at least one path for the larger object 116 corresponds to the amount of visible surface area of the object 116 that was directly changed in appearance (e.g. the portions of the path 128 that are not covering the smaller objects 112, 114) divided by the potentially visible forward facing surface area of the object when not being covered by the smaller objects 112, 114).

In some embodiments, a user may set this threshold so that more 50% or more of a forward facing surface area of an object needs to be directly traversed by at least one path before the processor causes it to be selected. Whereas other users may prefer to set the threshold below 50%, (such as 33%) so that relatively less forward facing surface area on an object needs to be covered in order to select it.

In order to provide visual feedback as to how characteristics of the motion input affects the change in appearance of the objects, an example embodiment of the processor may be configured to visually display the change in appearance as a painting process in which paint is deposited on the visible forward facing surfaces of the objects in response to the motion inputs. The visual form of the painting process, for example, may approximate a spray painting process (such as an air brush) in which rays of virtual paint are sprayed on the objects based on the motion inputs. However, in other embodiments visual forms of the painting processor may approximate a paint brush, paint roller, or a marker in which paint is spread across objects based on the motion inputs.

The path 128 depicted in View B of FIG. 1 depicts an example of an appearance change for a spray painting process, which has the previously described speckled form along the edges of the path 128. In other words, the change in appearance may not be a solid uniform change in color, but may include small individual speckles of areas that change color surrounded by areas that have not changed in color. Thus the path may include holes or thin/lighter areas which allow portions of the underlying surface to be visible between speckles of the paint.

In embodiments that model a spray painting process, a user may be enabled to control how much of the surface areas of the objects are covered or not covered at different portions of the path. For example, for relatively slower motion inputs (i.e., the speed of the motion along the path), the larger amount of surface area that may have a change in appearance (e.g., less holes in the painted surfaces of the objects and/or wider spread of paint). Thus, rather than having a highly speckled path, the virtual paint for the path may be more dense/solid and/or wider as the slow speed of the motion causes more speckles per unit of area. Whereas for relatively faster motion inputs, a smaller amount of surface area may change in appearance. Thus, rather than having a more dense/solid paint for the path, the paint for the path may be highly specked and/or less wide (with many holes), as the fast speed of the motion causes less speckles of paint per unit of area.

In addition, the rate at which surface areas change in appearance for a given speed of a motion input, may be controlled via one or more configurable properties via a configuration control of the GUI. For example, a sensitivity property may be configured in order to change the rate (surface area per time) at which a given area changes appearance. Thus a high sensitivity (high rate) may allow paths to be more dense/solid in a given amount of time, whereas a lower sensitivity (lower rate) may cause the path to be more speckled and/or less wide for the same given amount of time. Also for example, a spread size property may be configured in order to set the area/size of the application of paint (i.e., the size of a virtual paint brush, or the diameter of an output of spray paint). Thus a high spread size may produce a relatively wide stripe responsive to the motion input, whereas a relatively lower spread size may produce a relatively less wide of a stripe.

In an example embodiment that mimics a spray painting process, the path may be determined by the processor by calculating how 3D surface areas of the objects will change based on the direction and locations of calculated rays of paint being emitted from a virtual paint nozzle positioned and moved responsive to the motion inputs (e.g., the positions of a mouse pointer). A visual representation or animation of such a virtual paint nozzle and or rays of paint may or may not be displayed through the display device. For example, the processor may be configured to merely show a movable pointer 134 such as the generic circle shown in View B or other shape (e.g., arc, dot, nozzle icon) that represents the current location (and possible diameter/width) of the virtual paint nozzle. When a command to start painting is received (e.g., via a mouse click), the processor may be configured to immediately determine the path for where the rays of paint will impact the surfaces of the objects in the 3D workspace, and then in real-time change the appearance of the surfaces corresponding to the determined path to show corresponding painted surfaces on the objects.

In the previously described example in which virtual paint is modeled, in order to determine the location of the path, the virtual paint may extend in 3D with a form which follows the 3D contours of the objects that are covered by the virtual paint. The visible fraction of the forward facing 3D surface areas of the objects that are coated by the paint path would then be evaluated when determining whether to select the objects.

However, it should be appreciated that in other embodiments, the path may be determined by other methods and have a different appearance. For example, rather than having the processor model how a spray of rays of paint will change the appearance of surfaces of objects in a 3D workspace, instead the processor may model a paint brush or marker that creates a 2D path across the surface of the display device, which 2D path passes over the 3D surfaces of the objects. In this example, the 2D path corresponds to a flat overly or layer. The fraction of the forward facing 3D surface areas of the objects that are directly under the 2D path (from the vantage point of a user looking at the display screen) would then be evaluated when determining whether to select the objects.

In this example, the processor may be configured to change the 3D surfaces of the objects directly under the determined 2D path so as to have the change in appearance. Thus, in these described virtual painting embodiments, when the objects or workspace are rotated, the surfaces having the change in appearance can be viewed from different angles. Additional paths may be drawn on the structure after being rotated so as to select additional objects that may not have been sufficiently visible to select from the original orientation of the structure. In addition to rotation, the GUI may enable a user to pan and zoom in and out with respect to the workspace in order to place objects in a position and a desirable size which may be selected via one or more drawn paths.

The particular type of change in appearance that is displayed on the particular surfaces of an object that are traversed by the determined path may vary depending on what visible fraction of the forward facing surface areas of the object have changed in appearance. In example embodiments, the configured threshold surface area fraction may trigger when such a change in paint color occurs. Thus using motion inputs to direct one or more paths to cover an increasing percentage of an object, the color of the virtual paint on a particular object may change colors (e.g., from blue to red) to indicate to a user that the fraction of forwarding facing surface areas covered by the paint has passed the predetermined selection threshold and thus the object is now determined by the processor as being a selected object.

However, alternatively or in addition, when an object is determined to be selected based on the visible fraction of forwarding facing surface areas that have a change in appearance, the processor may be configured to cause a change in appearance to the object in addition to or in place of the change in appearance that occurs as the path is being drawn before the required threshold has been reached that causes the object to be selected. For example, as illustrated in views B and C of FIG. 1, the path 128 causes the outlines of the smaller objects 112, 114 to become relatively thicker (compared to View A), which indicates that the processor determined that these objects are selected responsive to the path 128 being drawn. It should also be noted that the outline of the larger object 116 continues to have the relatively thinner outline in all of views A, B, C, as the processor did not determine that this object was selected after the path 128 was drawn.

In the previously examples, the change in appearance has been described as simulating a virtual painting or marking process. However, it should be appreciated that in alternative embodiments, other forms of changes in appearance may be made based on the determined path corresponding to motion inputs by a user. For example, the application software component may cause a change in appearance that simulates burning a surface (e.g. simulating the effects of a blow torch, laser, electric arc, or other burning processes at locations traversed by the at least one path.)

In another example the application software component may cause a change in appearance that simulates adding material to a surface, such as adding tiles, cloth, carpet, wallpaper, or other material over the surface traversed by at least one path. In a further embodiment, the application software may cause a change in appearance that is based on a user selectable image or other graphic (e.g., a skinning or texturing image file) that is mapped to the portions of the surface that are traversed by the at least one path.

In another example, the change in appearance may correspond to a virtual structural change to the objects. For example, such structural changes may include replacing traversed portions of solid opaque surfaces with transparent or translucent surfaces, or replacing traversed portions of solid surfaces with perforated surfaces, a wire frame structure, or a mesh structure.

It should be appreciated that the described change in appearance may correspond to any change in appearance (or a combination of changes in appearances). Thus, a change in appearance where objects are traversed by at least one path is not limited to any particular example described herein.

Further, it should be appreciated that in some embodiments, the application software component may not initially cause a change in appearance other than showing a pointer cross over the surfaces of objects. Instead, the application software component may keep track of the areas of the surfaces traversed by the at least one path in memory until a threshold is reached that causes the objects to be selected. Then upon selection, the application software component may cause a change in appearance that visually highlights which objects have become selected.

In this example, the application software component may provide a user with the capability to turn off and on the feature to display a change in appearance to the portions of objects traversed by a path. Turning off the display of the change in appearance may be desirable in some circumstances (e.g., a remote desktop) to improve frame rates at which the GUI is updated and outputted through the display device.

Also, in another embodiment the application software component may only cause a temporary change in appearance such as simulating a flashlight moving in at least one path and temporarily illuminating portions of the surfaces of objects that are traversed by the at least one path. Similarly, the application software component may simulate a temporary heating of a metal with a heat source (e.g., a blow torch, laser) which results in a surface change in color approximating a glowing metal, which fades back to its original color after one or more seconds. As in the example where no change in appearance is made, the application software component may keep track of the areas of the surfaces traversed by the at least one path in memory (even after they fade back to their original coloring) until a threshold is reached that causes the objects to be selected.

In example embodiments, the GUI of the application software component may be capable of carrying out a plurality of operations on a group of selected objects, which were selected based on the amount (e.g., fraction) of visible forwarding facing surfaces that change in appearance based on being traversed by at least one path. Such operations may include deleting the selected objects, hiding the selected objects, copying the selected objects, and moving the selected objects with respect to the workspace responsive to at least one operation input 132 through the at least one input device 110. Also, it should be noted that such operations may include any type of operation that is applicable to the objects and for example may including displaying, determining, and/or changing properties (e.g., a volume, mass, or type of material) and/or metadata associated with the selected objects.

For example, View C of FIG. 1 illustrates an example, where an operation input corresponding to moving objects was provided through operation of the input device 110. Such an operation input may correspond to a mouse being operated to drag the selected objects 112, 114 as a group from the position shown in Views A and B to the position shown in View C with respect to the workspace 120 and larger object 116.

As used herein, an operation carried out on a group of selected objects correspond to a user directing a particular operation to be carried out which effects all of the objects in the group with the particular operation. Although more than one operation can be carried out, it should be appreciated that each of the operations affects all of the objects in the group.

Figure 2:
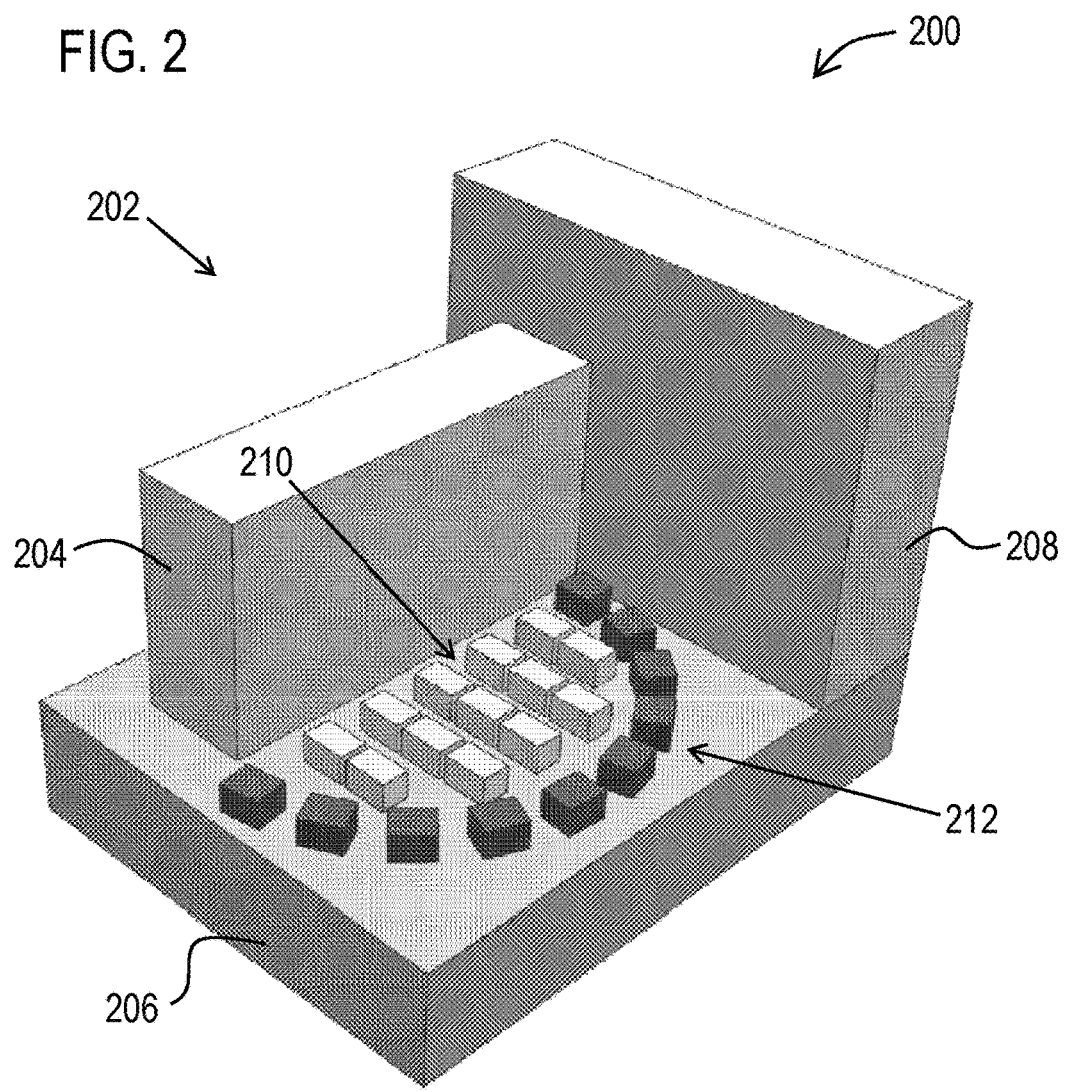
FIGS. 2-9 illustrate example visual outputs from a graphical user interface of selectable and selected three dimensional objects that comprise a structure.

In order to illustrate these example embodiments in more detail, FIGS. 2 to 9 show examples of display outputs from GUIs for CAD software, which depict objects being selected via drawing one or more paths across the objects. For example, FIG. 2 illustrates an example display output 200 of a structure 202 have three larger parts 204, 206, 208, a set of rectangular blocks 210 arranged in rows, and a set of cubic blocks 212 arranged in an arc.

In this example, large parts 204, 206, 208 can be selected easily by picking them (e.g., via individual mouse clicks with a selection tool). If the user wants to select the rectangular blocks 210 then the user would have to select a lot of small parts via individual mouse clicks. Thus FIG. 2 illustrates a structure in which the previously described selection via drawn paths may be more efficient than individually clicking on each object. Such drawn paths may correspond to a spray paint gesture. Such a spray paint gesture may be made available to a user via the GUI having a spray painting gesture tool on tool bar or menu option that is selectable with an input through the input device.

Figure 3:
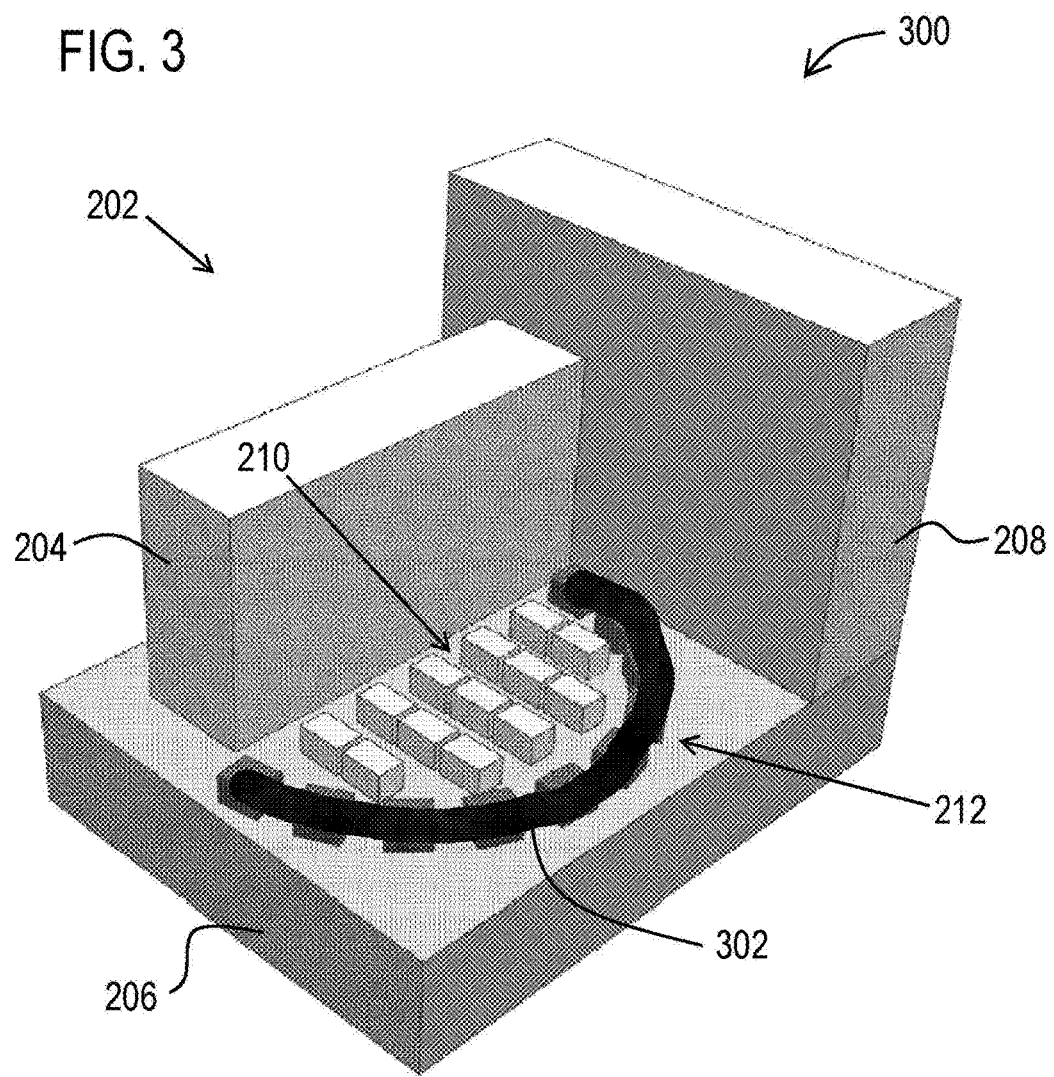

FIG. 3 illustrates an example display output 300 in which the spray paint gesture tool has been used to draw at least one path 302 over portions of the structure 202 in order to select the cubic blocks 212. Here the at least one path 302 may correspond to several back and forth spray painted stripes in an arc over top of the cubic blocks 212.

Such a spray paint gesture may also cover small portions of the larger part 206 between the small cubic blocks 212 as shown in FIG. 3. However the processor is operative to determine that the large part 206 is not selected because it only has a small amount of paint on it (i.e., only a small fraction of the forward facing surface of the part 206 has a change in appearance from the drawn path 302). Thus, the described paint gesture tool allows the user to paint around the rectangular blocks 210 and also permits a small spill of paint on the larger part 206 without causing the larger part 206 or rectangular blocks 210 to be selected.

Figure 4:
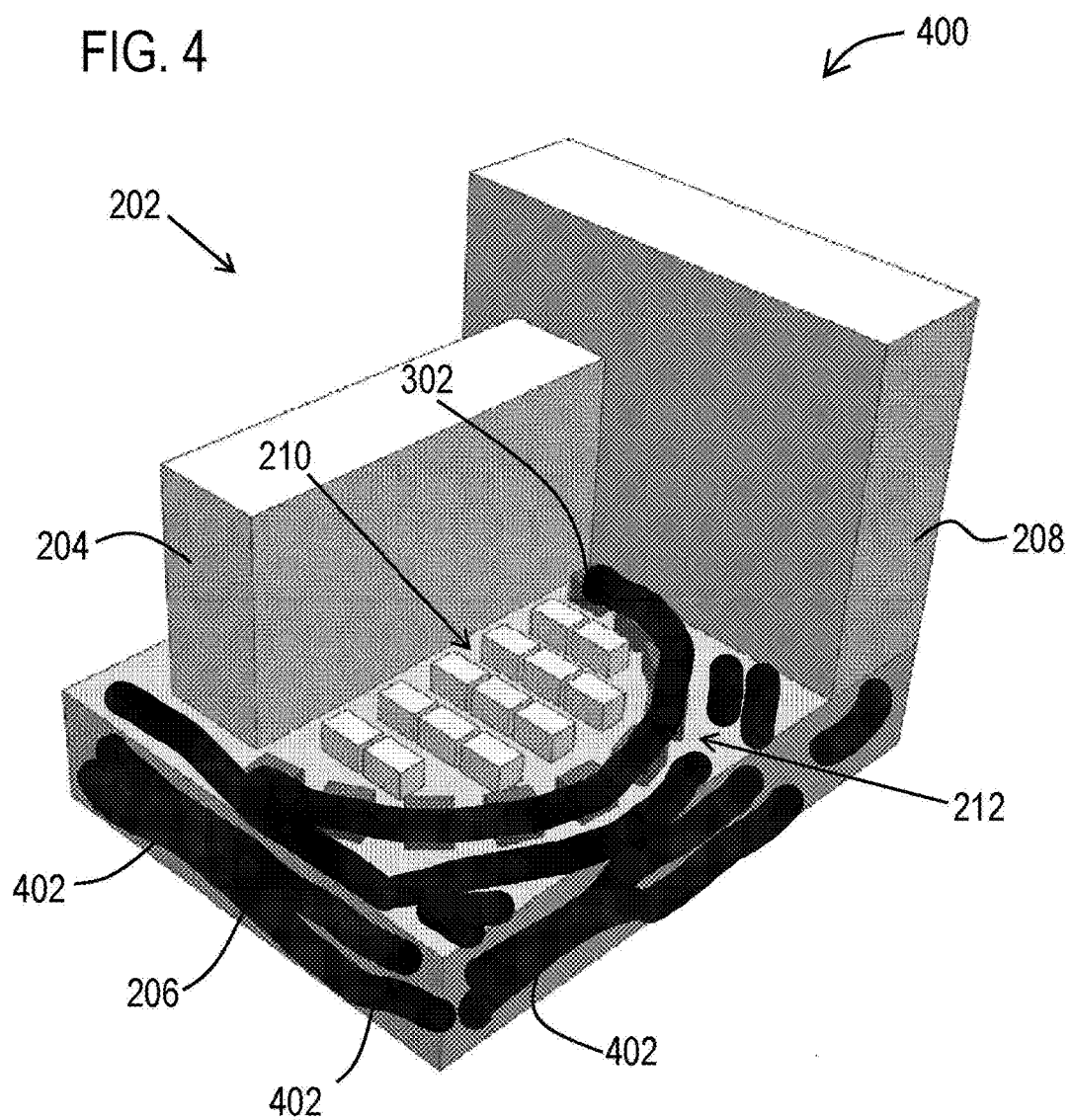

If the user had wanted to select the cubic blocks 212 and the large part 206 below them, then the user may use the described spray paint gesture tool as shown in the example display output 400 in FIG. 4. Here the user has drawn additional paths 402 (e.g., spray painted stripes) across the sides and more of the top surface of the large part 206 in order to surpass a threshold (such as 50% of the forward facing area of the object) that causes the larger part 206 to be selected.

Figure 5:
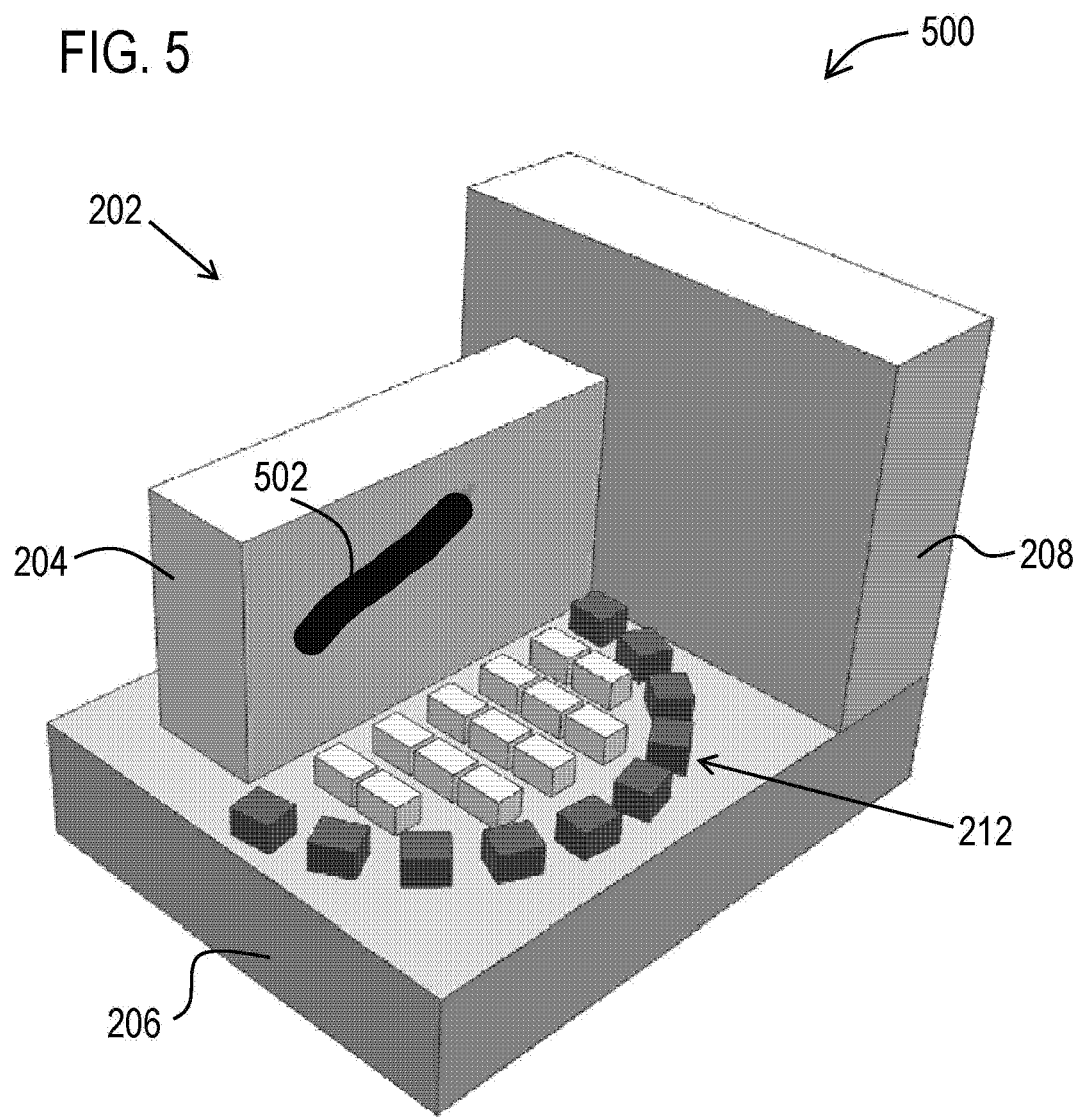

In example embodiments, the spray paint gesture tool may be make selections based on time as well. For example, FIG. 5 shows a further example display output 500 of the structure 202 in which the user has drawn a single path 502 on the larger part 204. In this example, even though only a small surface area has been covered by the path, based on the absence of any further paths being drawn on other objects for a predetermined amount of time, the at least one processor may be configured to make the larger part 204 be selected.

Figure 6:
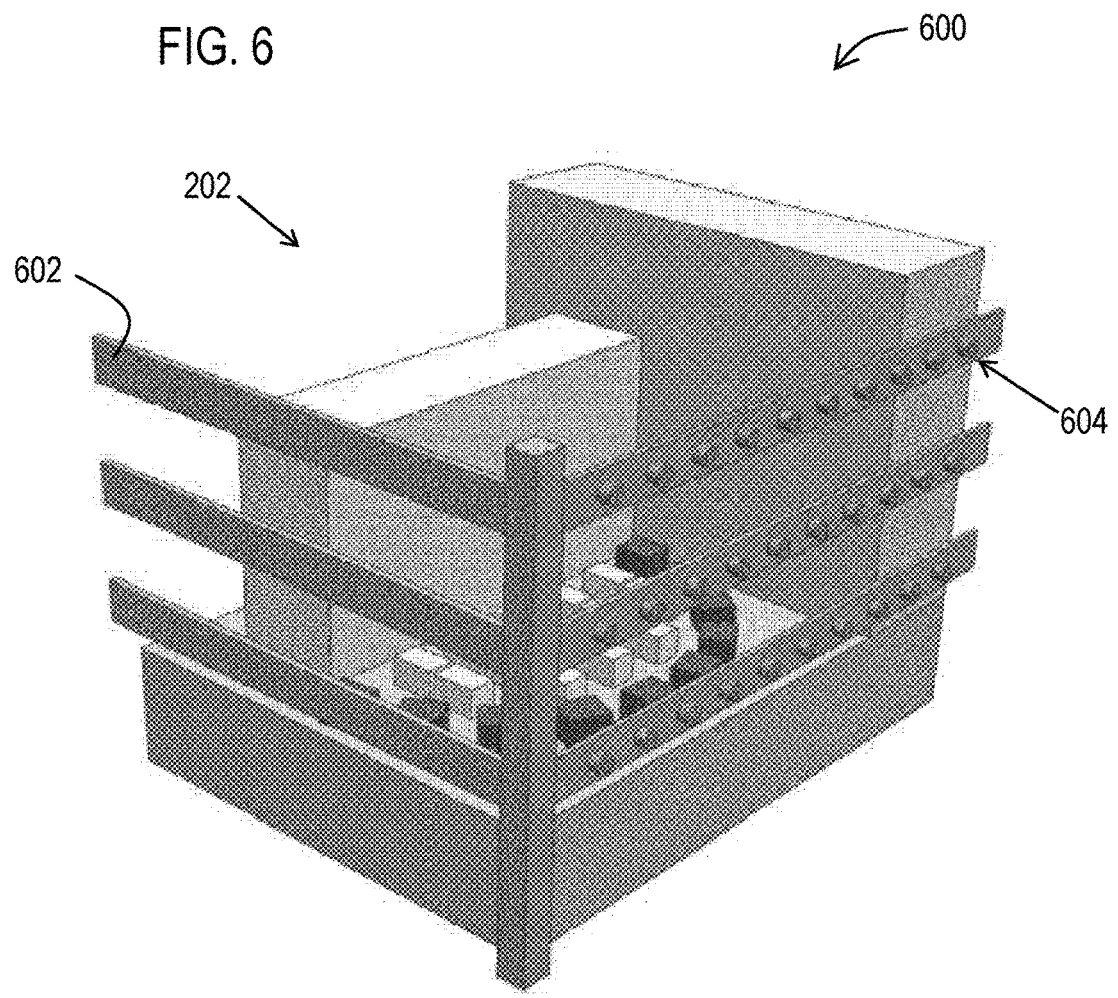

FIG. 6 illustrates a further example display output 600 in which drawn paths may provide a faster and less cumbersome process to select objects without accidently selecting undesirable objects. In this example, a fence 602 is positioned in front of the previously described structure 202 shown in FIGS. 2-5. Here a portion of the fence includes several small cylinders 604.

Figure 7:
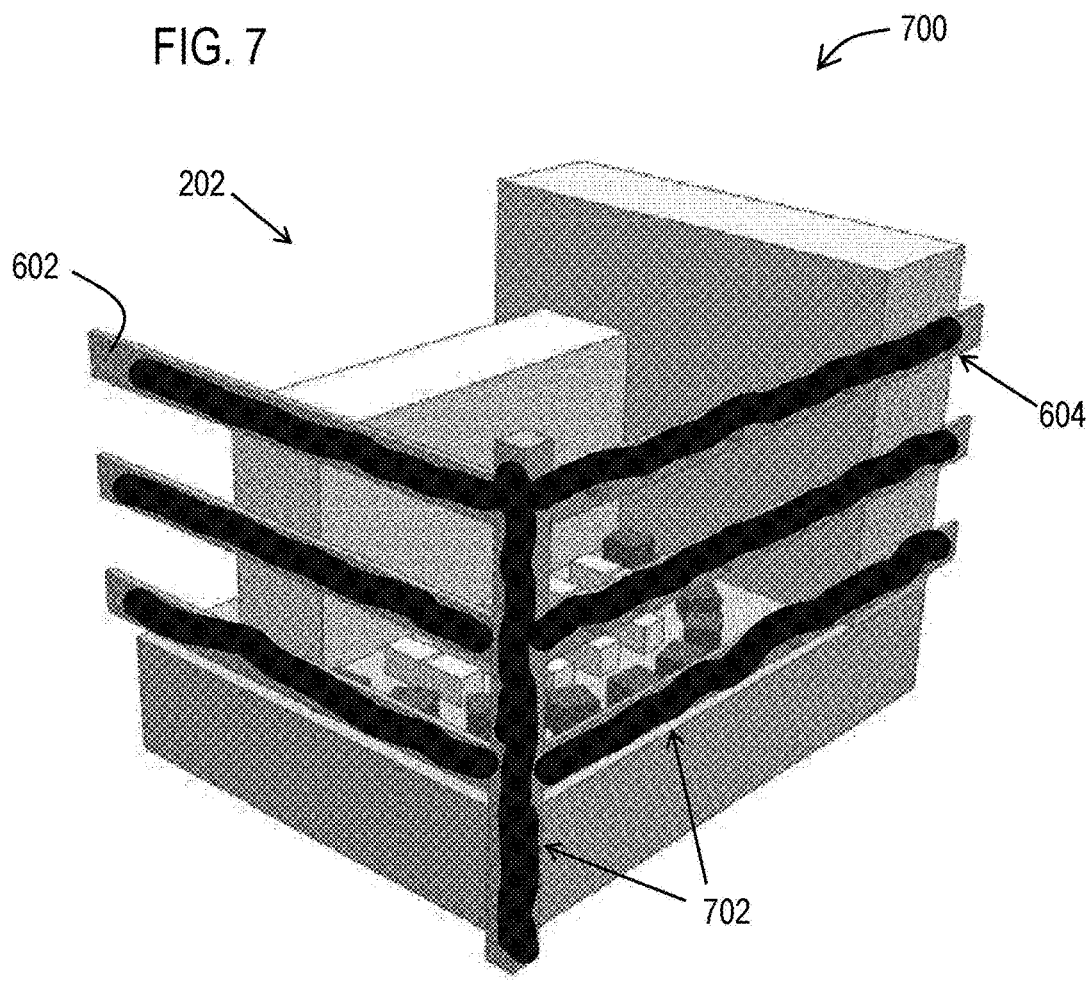
Figure 8:
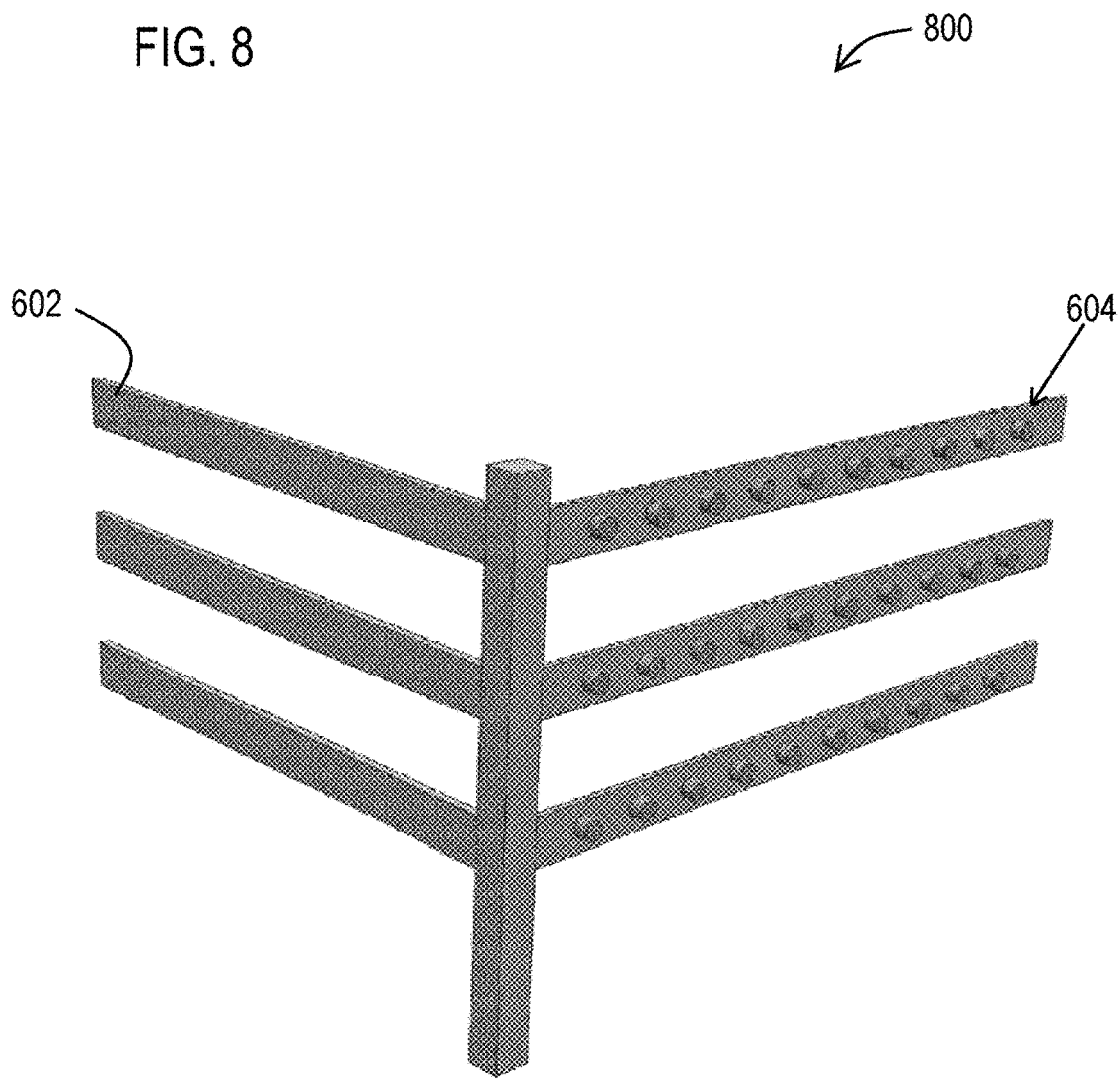

As shown in the display output 700 of FIG. 7, in order to carry out a deletion or hiding operation that removes the fence 602 and small cylinders 604, the user may draw (e.g., virtually paint) several quick paths 702 (e.g., stripes) across the fence 602 and across the small cylinders 604 in order to select just the fence and small cylinders. An operation to delete this selected group of objects would leave just the structure 202 shown in FIG. 1. Alternatively, an operation to isolate the selected objects (e.g., an inverse selection based on the selected object, which removes all but the selected objects) would leave just the selected objects 602, 604 shown in the example display output 800 of FIG. 8. It should also be appreciated that the application software may enable currently non-selected objects to become selected and the previously selected objects to become unselected based on an inverse selection operation carried out on the selected objects.

In example embodiments, the described selection mode may draw a path (which places paint on objects) in places the motion inputs move a pointer. However, in further embodiments, the places a path is drawn may be restricted to objects in certain locations. For example, the 3D workspace may have first, second, and third axes that are orthogonal to each other. The plane of the 2D display screen (that displays the workspace) may extend across the first and second axis and the GUI may render objects in the workspace so as to visually appear to have a depth that extends rearward along the third axis. The described path may extend across the first and second axes of the workspace responsive to movement of a pointer across a display screen. However, the path may extend only to places where objects are within a determined depth level in the third axis of the workspace.

Figure 9:
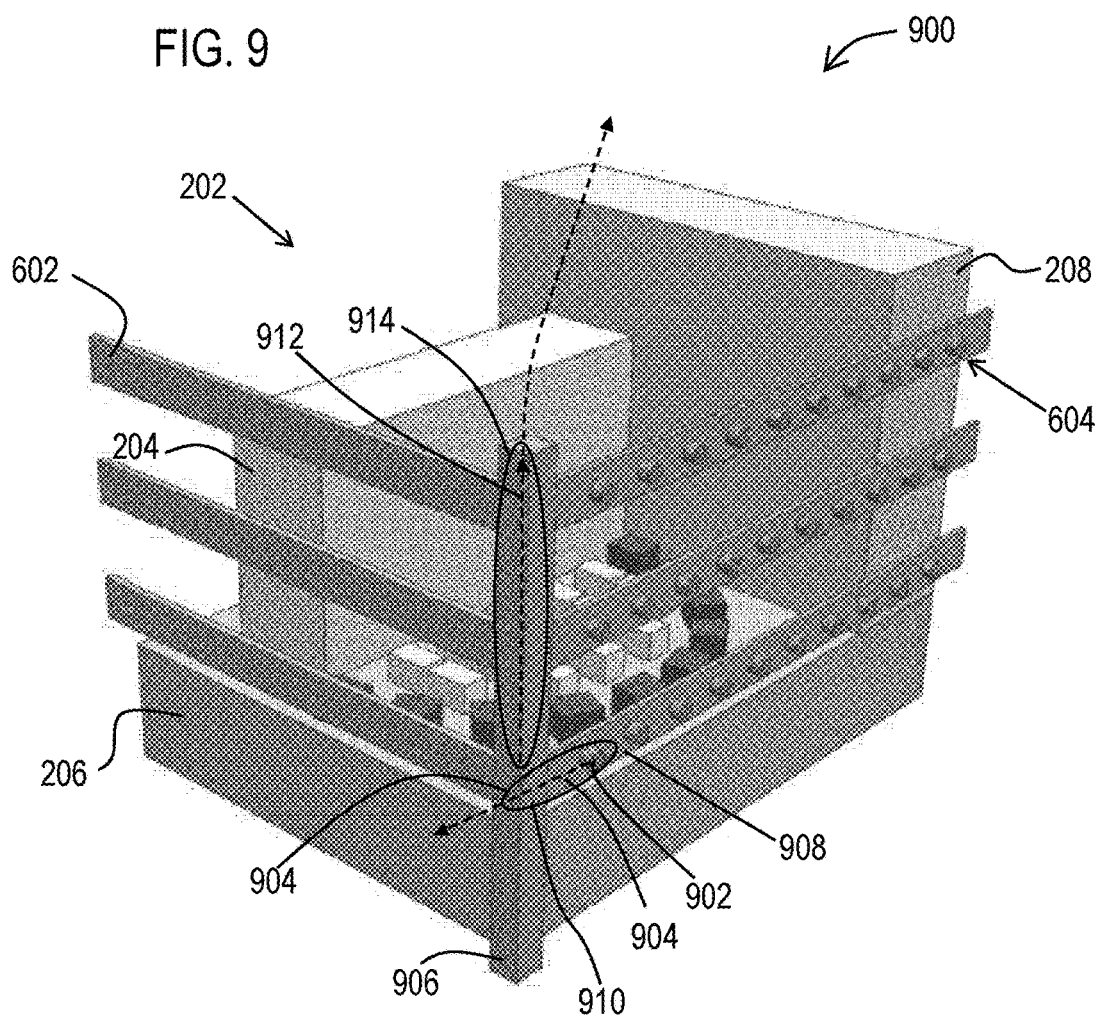

Such a depth level may be determined based on where the path was initial started (e.g., via pressing a button on the input device). For example, FIG. 9 illustrates another example display output showing the previously described structure 202 and fence 602. In this example, a user may begin to generate a motion input 904 via a mouse (or other input device) by clicking on the display screen over a position such as the location of a small cylinder 902 and move along the railing towards the vertical post 906. In response to this motion input, the at least one processor may be configured to determine a range of depths along the third axis of the workspace (e.g., along the depth of the workspace) based on the location of the small cylinder 902 along the third axis. Such a determined depth range, for example, may correspond to the positions of objects immediately in front of and behind the location of the small cylinder 902 with respect to the third axis, such as the portions of the left side of the horizontal rail 908 and the portions of the vertical post 906.

Thus, as shown in FIG. 9, a path 910 will be drawn according to the motion input that paints the small cylinder 902, the left side of the horizontal rail 908 and portions of the vertical post 906. However, if the user continues to move the mouse pointer for the motion input 904 over the lower part 206, the processor is operative to forgo drawing the path 910 on the part 206, because the portion of the part 206 crossed by the motion input may be outside of the determined depth range.

Similarly, the user may operate a mouse or other input device to produce a further motion input 912 upwardly along the vertical post 906. Thus, a corresponding path 914 may be drawn so as to paint the upper portion of the vertical post 906. However, if the motion input continued upwardly over the larger parts 204 and 208, the processor is operative to forgo drawing the path 914 on the parts 204, 208 because these parts would be outside the depth range determined based on the initial start of the path on the vertical post 906.

In example embodiments, the GUI may have several different selectable selection modes, including the previously described surface selection mode in which the processor is configured to determine when to select objects based on the visible fraction of forward facing surface area that is traversed by the at least one path. Such different selection modes may also include the previously described selections via a rectangular selection box and/or by individually clicking on each desired object to be selected.

In addition to these selection modes, a GUI may also include a selectable penetration selection mode. When the GUI is in the penetration selection mode, rather than drawing a path over objects, instead the processor may be configured to be responsive to at least one second motion input through operation of at least one input device to cause objects to be selected that are traversed by at least one second path corresponding to the at least one second motion input and that have a position within a predetermined penetration depth range. As a result, objects that are and are not occluded partially and/or fully by other objects may be selected when they are directly or indirectly traversed by the path and that are within the predetermined depth range. Further, it should be appreciated that the depth range may sufficiently large (including unlimited) so as to select all objects in a workspace that are traversed by the second path.

For example, as illustrated in FIG. 9, if the motion input 912 were carried out while the GUI was in the penetration selection mode, all of the visible objects that are traversed by the path of the motion input may be selected such as the vertical post 906 and the larger parts 204, 208. Also, in addition to these larger parts, the smaller blocks that are not visible, but are hidden behind the vertical post 906 and that are traversed by the path may be selected as well.

However, it should be appreciated that the depth of the penetration mode may be limited via a user configurable penetration depth level or range such that objects outside this depth level or range may not be selected even if they are traversed by the path. Further, in this described penetration selection mode, selected objects that are visible may be visually highlighted through the display device so that selected objects are visually distinctive relative to unselected objects.

In addition, in example embodiments, selection modes may be associated with one or more different operations that are automatically carried out by the processor on the selected object, when the object is determined to be selected. For example, the previously described surface selection mode may be configured via the GUI so that as soon as an object is selected, the object may become deleted, hidden, invisible, and/or deemphasized (e.g., partially transparent) so that objects occluded by the selected object may immediately become visible when the occluding object becomes selected. In this manner a user may carry out a painting operation which virtually paints objects and causes the objects to become selected so as to peel away layers of a structure to unhide objects in lower positions, which may then be virtually painted as well so as to peel away additional layers of the structure.

When objects are deemphasized (e.g., partially transparent), such objects may be made opaque again via a painting operation as well. For example, the processor may be configured to enable partially transparent objects to be painted via the previously described drawn paths in order to select them. The selection of a deemphasized object may immediately and automatically cause the object to become opaque again (e.g., no longer deemphasized).

It should also be appreciated that the previously described functions that are carried out in different modes of operation of the GUI may be carried out in the same mode. For example, the GUI may be configured to carry out one or more of the previously described selections at any one time using different types of inputs or input gestures via one or more input devices without needing to specifically change a mode of operation that effects how inputs are interpreted in order to select objects.

In example embodiments, the describe application software component may be responsive to the operations carried out on a selected set of objects associated with a structure to modify that structure. CAD data and/or product data corresponding to the modified structure may be stored in a CAD file and/or a PLM database. The described application software component and/or other software application may then carry out various functions based on the modified structure stored in the CAD data and/or product data.

Such functions may include generating (based on the CAD data and/or product data) engineering drawings and/or a Bill of Material (BOM) that specifies particular components (and quantities thereof) that may be used to build the structure. Such engineering drawings and/or BOM may be printed via a printer on paper, generated in an electronic form such as a Microsoft Excel file or Acrobat PDF file, displayed via a display device, communicated in an e-mail, stored in a data store, or otherwise generated in a form capable of being used by individuals and/or machines to build a product corresponding to the designed structure. Further, it should be appreciated that a machine such as a 3D printer may use data corresponding to the CAD data to produce a physical structure (e.g., a part).

Figure 10:
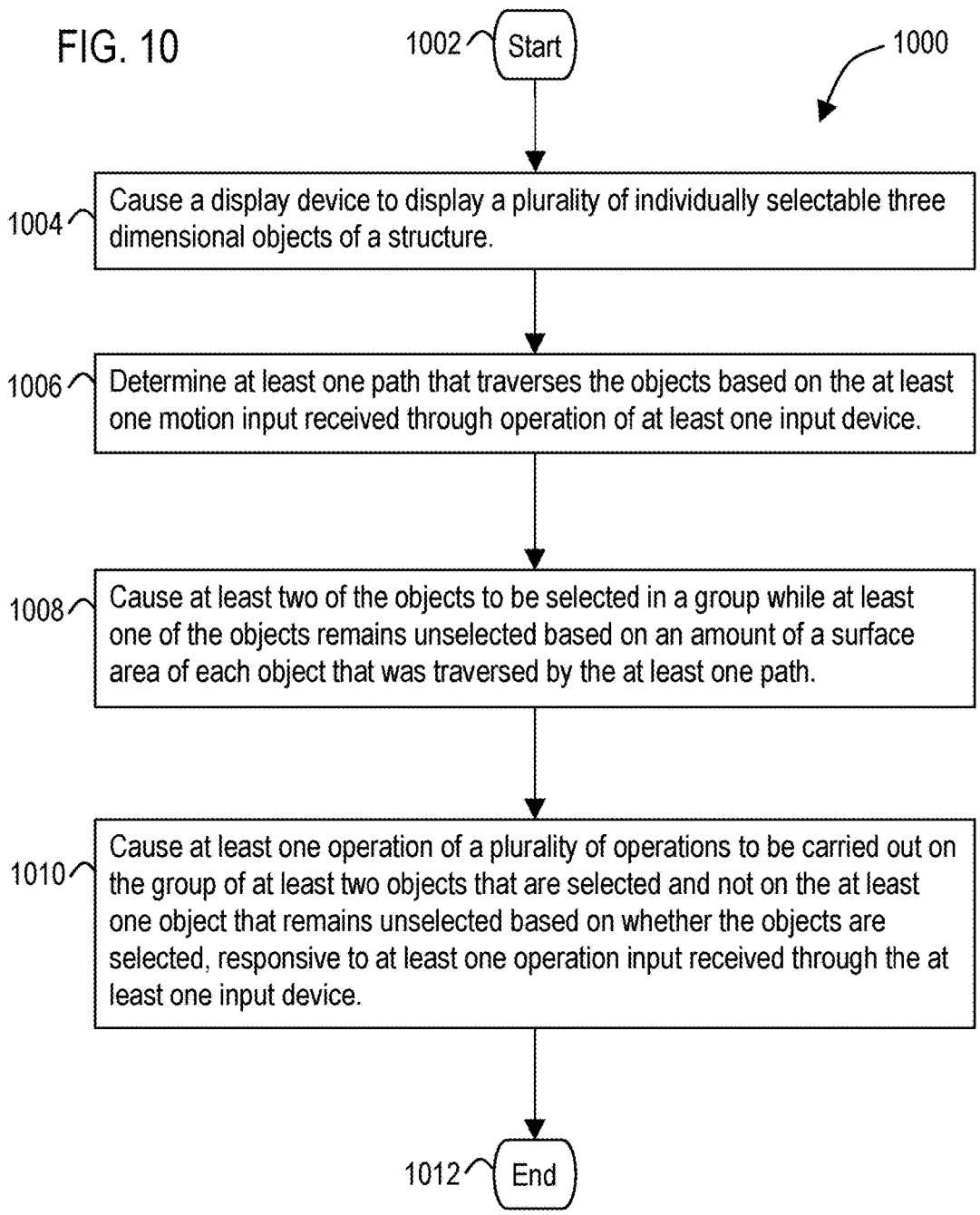
FIG. 10 illustrates a flow diagram of an example methodology that facilitates selection of objects.

With reference now to FIG. 10, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 10, a methodology 1000 that facilitates the selection of objects is illustrated. The method may start at 1002 and the methodology may include several acts carried out through operation of at least one processor. These acts may include an act 1004 of causing a display device to display a plurality of individually selectable three dimensional objects of a structure. Also, the methodology may include the act 1006 of determining at least one path that traversed the objects based on the at least one motion input received through operation of at least one input device. In addition, the methodology may include the act 1008, of causing at least two of the objects to be selected in a group while at least one of the objects remains unselected based on an amount of a surface area of each object that was traversed by the at least one path. Also, the methodology may include the act 1010 of causing at least one operation of a plurality of operations to be carried out on the group of at least two objects that are selected and not on the at least one object that remains unselected based on whether the objects are selected, responsive to at least one operation input received through the at least one input device. At 1012 the methodology may end.

It should be appreciated that the methodology 1000 may include other acts and features discussed previously with respect to the system 100. For example, the methodology may include an act of causing a change in appearance to portions of each particular object that are traversed by the at least one path. In this example, the at least two of the objects having the change in appearance may be selected in the group while the at least one of the objects having the change in appearance remains unselected based on the amount of a surface area of each object that was traversed by the at least one path.

In addition, the methodology may include generating a graphical user interface (GUI) through the display device, which GUI displays the objects in a workspace, and which GUI is capable of carrying out the plurality of operations on the group of selected objects responsive to further inputs received through operation of the at least one input device. Such operations may include deleting the selected objects, hiding the selected objects, copying the selected objects, moving the selected objects, and displaying information about the selected objects.

As discussed previously, each of the objects displayed through the display device includes a forward facing surface area that is capable of being fully visible when displayed through the display device while not being occluded by one or more other objects. In an example embodiment, the methodology may include determining an amount of forward facing surface area for each object. Further, the step 1010 may include causing the at least two objects having the change in appearance to be selected while the at least one object having the change in appearance remains unselected based on the visible fraction of the determined amount of forward facing surface area of each object that was traversed by the at least one path.

In addition, the methodology may include determining a threshold amount that corresponds to a fractional amount of a forward facing surface area. The step 1010 of causing the at least two objects having the change in appearance to be selected may be carried out based on the visible fraction of the determined amount of forward facing surface area of each object that was traversed by the at least one path that is equal to or greater than the threshold amount.

Also in example embodiments, the act 1006 of determining the at least one path may be carried out based on a determination where a virtual paint being sprayed onto visible surfaces of the objects responsive to the at least one motion inputs will be located. The change in appearance of the portions of the objects may correspond to a virtual representation of the paint sprayed on the objects based on the determined path.

It should be appreciated that in example embodiments, the GUI is configured to display the objects in a three dimensional workspace having a first, second, and third axis that are orthogonal to each other. In this example the path extends in the first and second axes of the workspace which may correspond to the plane of the display screen. The third axis may correspond to the virtual depth of the three dimension workspace in which objects are depicted through the display screen. The example methodology may include determining a range of depths along the third axis of the workspace. In addition, the act 1008 of causing the objects to have the change in appearance may be based on the objects being displayed in the workspace in positions that are within the range of depths. Also, the at least one object may not be changed in appearance based on the position of the object being outside the range of depths.

As discussed previously, a path may include a starting point at a first object. The act 1006 of determining the range of depths may then include determining the range of depths based on the depth of a visible surface area of the first object that is traversed by the path. Thus the particular range of depths for a particular path can be set by a user choosing where to start the drawing of a path. It should also be appreciated that each new path that us initiated by a user, could establish a different range of depths based on the initial depth of the visible surface of the object that is first traversed by the new path.

In example embodiments, the GUI may enable a current selection mode to be changeable between a surface selection mode and a penetration selection mode. The act 1010 of causing at least two of the objects to be selected based on the visible fraction of forward facing surface area that is traversed by the at least one path, may be carried out based on the GUI being in the surface selection mode. The example methodology may include an act of changing the current selection mode to the penetration selection mode. Once in the penetration selection mode, the methodology may include an act of being responsive to at least one second motion input through operation of at least one input device, to cause objects that are completely occluded by other objects to be selected that are traversed by at least one second path corresponding to the at least one second motion input and that have a position within a predetermined penetration depth range.

In example embodiments, objects that become selected may be visually highlighted. Thus the example methodology may comprise an act in which responsive to the at least two objects being determined to be selected based on the visible fraction of forward facing surface area that is traversed by the at least one path, causing a further change in appearance to the at least two objects in addition to or in place of the change in appearance prior to the at least two objects being determined to be selected.

As discussed previously, modifications to structures based on operations carried out on selected groups of objects may be persisted as CAD data and/or product data to a CAD file and/or a PLM data store. Acts associated with generating engineering drawings and/or a BOM may then be carried out based on the CAD data or product data. Further, the methodology may include individuals manually building the structure based on the engineering drawings and/or BOM. Further such acts may include a machine (such as a 3D printer) building a structure based on the CAD data.

As discussed previously, acts associated with these methodologies (other than any described manual acts such as an act of manually building a structure) may be carried out by one or more processors. Such processor(s) may be included in one or more data processing systems, for example, that execute software components operative to cause these acts to be carried out by the one or more processors. In an example embodiment, such software components may be written in software environments/languages/frameworks such as Java, JavaScript, Python, C, C#, C++ or any other software tool capable of producing components and graphical user interfaces configured to carry out the acts and features described herein.

Figure 11:
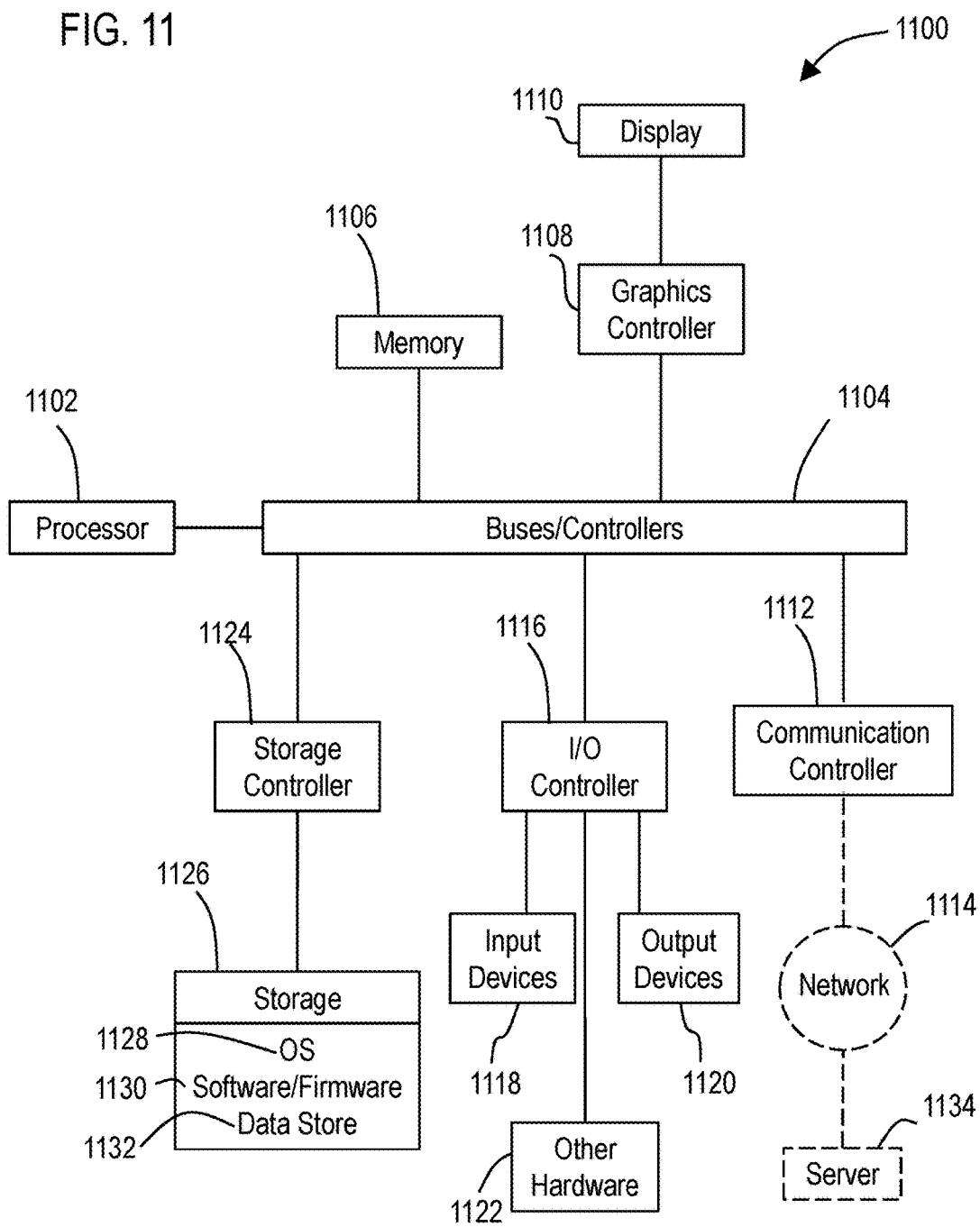
FIG. 11 illustrates a block diagram of a data processing system in which an embodiment can be implemented.

FIG. 11 illustrates a block diagram of a data processing system 1100 (also referred to as a computer system) in which an embodiment can be implemented, for example, as a portion of a PLM, CAD, and/or other system operatively configured by software or otherwise to perform the processes as described herein. The data processing system depicted includes at least one processor 1102 (e.g., a CPU) that may be connected to one or more bridges/controllers/buses 1104 (e.g., a north bridge, a south bridge). One of the buses 1104, for example, may include one or more I/O buses such as a PCI Express bus. Also connected to various buses in the depicted example may include a main memory 1106 (RAM) and a graphics controller 1108. The graphics controller 1108 may be connected to one or more display devices 1110. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1112 (Ethernet controllers, WiFi controllers, cellular controllers) operative to connect to a local area network (LAN), Wide Area Network (WAN), a cellular network, and/or other wired or wireless networks 1114 or communication equipment.

Further components connected to various busses may include one or more I/O controllers 1116 such as USB controllers, Bluetooth controllers, and/or dedicated audio controllers (connected to speakers and/or microphones). It should also be appreciated that various peripherals may be connected to the USB controller (via various USB ports) including input devices 1118 (e.g., keyboard, mouse, touch screen, trackball, gamepad, camera, microphone, scanners, motion sensing devices), output devices 1120 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 1122 connected to the I/O controllers 1116 may include any type of device, machine, or component that is configured to communicate with a data processing system.

Additional components connected to various busses may include one or more storage controllers 1124 (e.g., SATA). A storage controller may be connected to a storage device 1126 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1104 such as a PCI Express bus.

A data processing system in accordance with an embodiment of the present disclosure may include an operating system 1128, software/firmware 1130, and data stores 1132 (that may be stored on a storage device 1126 and/or the memory 1106). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data which is retrievable by a processor.

The communication controllers 1112 may be connected to the network 1114 (not a part of data processing system 1100), which can be any public or private data processing system network or combination of networks, as known to those of skill in the art, including the Internet. Data processing system 1100 can communicate over the network 1114 with one or more other data processing systems such as a server 1134 (also not part of the data processing system 1100). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1102 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1100 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1100 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system that provides object selection comprising:
   at least one processor configured via executable instructions included in at least one memory to:
      cause a display device to display a plurality of individually selectable three dimensional objects in a three dimensional workspace having a first, second, and third axis that are orthogonal to each other;
      determine at least one path that traverses the objects based on at least one motion input received through operation of at least one input device, wherein the path extends in first and second axes of the workspace, wherein the path includes a starting point at a first object;
      determine a range of depths along the third axis of the workspace, based on the depth of a visible surface area of the first object that is traversed by the path;
      cause at least portions of a set of the objects that are traversed by the at least one path to have the change in appearance based on the first set of objects being displayed in the workspace in positions that are within the range of depths, and not change the appearance of at least one object based on a position of the at least one object being outside the range of depths;
      cause at least two of the objects in the set of objects to be selected in a group while at least one of the objects in the set of objects remains unselected based on an amount of a surface area of each object in the set that has the change in appearance, wherein objects that did not change in appearance when traversed by the at least one path also remain unselected; and
      cause at least one operation of a plurality of operations to be carried out on the group of at least two objects that are selected and not on the objects that remain unselected based on whether the objects are selected, responsive to at least one operation input received through the at least one input device.

2. The system according to claim 1, wherein the at least one processor configured to:
   cause the at least two of the objects in the set of objects having the change in appearance to be selected in the group while the at least one of the objects in the set of objects having the change in appearance remains unselected based on the amount of the surface area of each object in the set of objects that has the change in appearance.

3. The system according to claim 2, wherein the at least one processor is operative to generate a graphical user interface (GUI) through the display device, which GUI displays the objects in the workspace, and which GUI is capable of carrying out the plurality of operations on the group of selected objects responsive to further inputs received through operation of the at least one input device, which operations include deleting the selected objects, hiding the selected objects, copying the selected objects, moving the selected objects, and displaying information about the selected objects.

4. The system according to claim 3, wherein each of the objects in the set of objects includes a forward facing surface area that is capable of being fully visible when displayed through the display device while not being occluded by one or more other objects, wherein the at least one processor is configured to determine an amount of forward facing surface area for each object in the set of objects, wherein the at least one processor is configured to cause the at least two objects in the set of objects having the change in appearance to be selected while the at least one object in the set of objects having the change in appearance remains unselected based on the visible fraction of the determined amount of forward facing surface area of each object in the set of objects that has the change in appearance.

5. The system according to claim 4, wherein the at least one processor is operative to determine a threshold amount that corresponds to a fractional amount of a forward facing surface area, wherein the at least one processor is configured to determine the objects in the set of objects to be selected that have the visible fraction of the determined amount of forward facing surface area of each object that has the change in appearance that is equal to or greater than the threshold amount.

6. The system according to claim 5, wherein the change in appearance of the portions of the objects corresponds to a virtual representation of a paint sprayed on the objects.

7. The system according to claim 6, wherein the GUI enables a current selection mode to be changeable between a surface selection mode and a penetration selection mode, wherein when the GUI is in the surface selection mode, the at least one processor is configured to determine when to select objects based on the visible fraction of forward facing surface area that has the change in appearance, wherein when the GUI is in the penetration selection mode, the at least one processor is configured to be responsive to at least one second motion input through operation of at least one input device to cause objects that are completely occluded by other objects to be selected that are traversed by at least one second path corresponding to the at least one second motion input and that have a position within a predetermined penetration depth range.

8. The system according to claim 6, wherein when an object is determined to be selected based on the visible fraction of forward facing surface area that has the change in appearance, the processor is configured to cause a further change in appearance to the object in addition to or in place of the change in appearance prior to the object being determined to be selected.

9. A method for object selection comprising:
through operation of at least one processor:
causing a display device to display a plurality of individually selectable three dimensional objects in a three dimensional workspace having a first, second, and third axis that are orthogonal to each other;
determining at least one path that traverses the objects based on the at least one motion input received through operation of at least one input device, wherein the path extends in first and second axes of the workspace, wherein the path includes a starting point at a first object;
determining a range of depths along the third axis of the workspace, based on the depth of a visible surface area of the first object that is traversed by the path;
causing at least portions of a set of the objects that are traversed by the at least one path to have the change in appearance based on the first set of objects being displayed in the workspace in positions that are within the range of depths, and not change the appearance of at least one object based on a position of the at least one object being outside the range of depths;
causing at least two of the objects in the set of objects to be selected in a group while at least one of the objects in the set of objects remains unselected based on an amount of a surface area of each object in the set that has the change in appearance, wherein objects that did not change in appearance when traversed by the at least one path also remain unselected; and
causing at least one operation of a plurality of operations to be carried out on the group of at least two objects that are selected and not on the objects that remain unselected based on whether the objects are selected, responsive to at least one operation input received through the at least one input device.

10. The method according to claim 9, further comprising:
wherein the at least two of the objects in the set of objects having the change in appearance are selected in the group while the at least one of the objects in the set of objects having the change in appearance remains unselected based on the amount of a surface area of each object in the set of objects that has the change in appearance.

11. The method according to claim 10, further comprising:
through operation of the at least one processor, generating a graphical user interface (GUI) through the display device, which GUI displays the objects in the workspace, and which GUI is capable of carrying out the plurality of operations on the group of selected objects responsive to further inputs received through operation of the at least one input device, which operations include deleting the selected objects, hiding the selected objects, copying the selected objects, moving the selected objects, and displaying information about the selected objects.

12. The method according to claim 11, wherein each of the objects in the set of objects includes a forward facing surface area that is capable of being fully visible when displayed through the display device while not being occluded by one or more other objects, further comprising:
through operation of the at least one processor: determining an amount of forward facing surface area for each object in the set of objects,
wherein causing the at least two objects in the set of objects having the change in appearance to be selected while the at least one object in the set of objects having the change in appearance remains unselected based on the visible fraction of the determined amount of forward facing surface area of each object in the set of objects that has the change in appearance.

13. The method according to claim 12, further comprising:
through operation of the at least one processor, determining a threshold amount that corresponds to a fractional amount of a forward facing surface area;

wherein causing the at least two objects in the set of objects having the change in appearance to be selected is carried out based on the visible fraction of the determined amount of forward facing surface area of each object has the change in appearance that is equal to or greater than the threshold amount.

14. The method according to claim 13, wherein the change in appearance of the portions of the objects corresponds to a virtual representation of a paint sprayed on the objects.

15. The method according to claim 14, wherein the GUI enables a current selection mode to be changeable between a surface selection mode and a penetration selection mode, wherein determining which objects to select based on the fraction of visible forward facing surface area that has the change in appearance is carried out based on the GUI being in the surface selection mode, further comprising:
changing the current selection mode to the penetration selection mode; and
responsive to at least one second motion input through operation of at least one input device, causing objects that are completely occluded by other objects to be selected that are traversed by at least one second path corresponding to the at least one second motion input and that have a position within a predetermined penetration depth range.

16. The method according to claim 14, further comprising responsive to the at least two objects of the set of objects being determined to be selected based on the visible fraction of forward facing surface area that has the change in appearance, causing a further change in appearance to the at least two objects in addition to or in place of the change in appearance prior to the at least two objects being determined to be selected.

17. A non-transitory computer readable medium encoded with executable instructions that when executed by at least one processor, cause the at least one processor to carry out a method for object selection comprising:
causing a display device to display a plurality of individually selectable three dimensional objects in a three dimensional workspace having a first, second, and third axis that are orthogonal to each other;
determining at least one path that traverses the objects based on the at least one motion input received through operation of at least one input device, wherein the path extends in first and second axes of the workspace, wherein the path includes a starting point at a first object;
determine a range of depths along the third axis of the workspace, based on the depth of a visible surface area of the first object that is traversed by the path;
cause at least portions of a set of the objects that are traversed by the at least one path to have the change in appearance based on the first set of objects being displayed in the workspace in positions that are within the range of depths, and not change the appearance of at least one object based on a position of the at least one object being outside the range of depths;
causing at least two of the objects in the set of objects to be selected in a group while at least one of the objects in the set of objects remains unselected based on an amount of a surface area of each object in the set that has the change in appearance, wherein objects that did not change in appearance when traversed by the at least one path also remain unselected; and
causing at least one operation of a plurality of operations to be carried out on the group of at least two objects that are selected and not on the that remain unselected based on whether the objects are selected, responsive to at least one operation input received through the at least one input device.

\* \* \* \* \*